D. HUSSEY.
Speed Indicator.
No. 201,677.  Patented March 26, 1878.
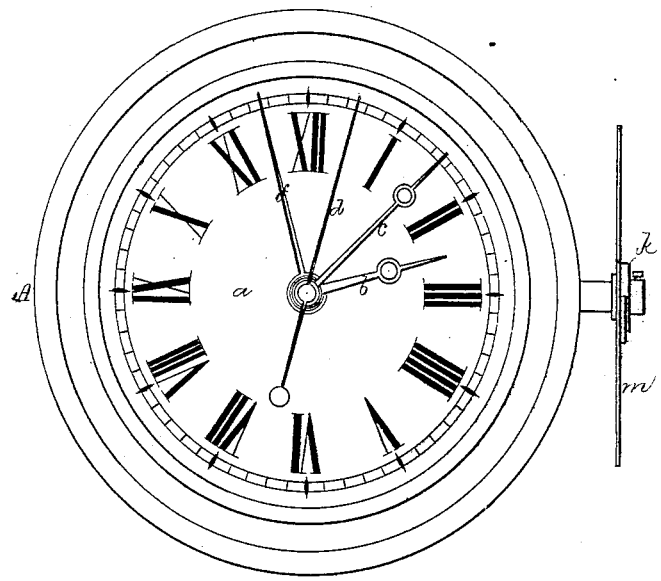
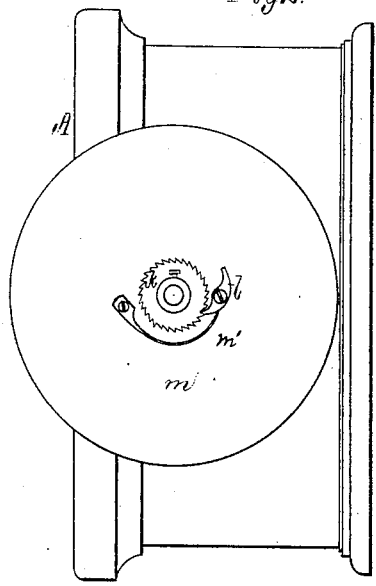
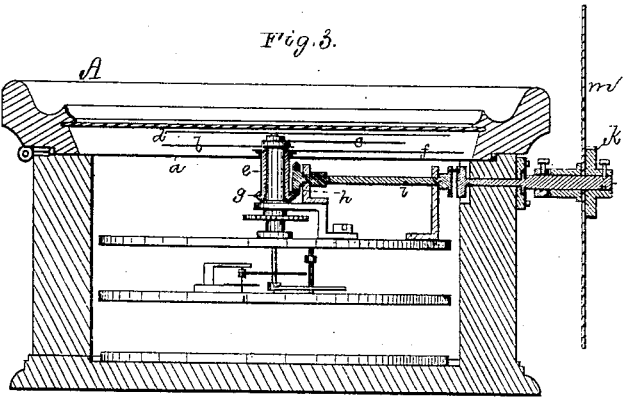
Witnesses.
S. N. Piper
L. M. Möller
Inventor
Daniel Hussey
by his Attorney
R. H. Eddy

UNITED STATES PATENT OFFICE.

DANIEL HUSSEY, OF LOWELL, MASSACHUSETTS.

IMPROVEMENT IN SPEED-INDICATORS.

Specification forming part of Letters Patent No. 201,677, dated March 26, 1878; application filed October 16, 1877.

*To all whom it may concern:*

Be it known that I, DANIEL HUSSEY, of Lowell, in the county of Middlesex and State of Massachusetts, have invented a new and useful Apparatus for Indicating the Speed of an Engine or Machine; and do hereby declare the same to be described in the following specification and represented in the accompanying drawings, of which—

Figure 1 is a front elevation. Fig. 2 is a side view, and Fig. 3 a transverse section, of it.

Though equally applicable to various other machines, it is especially intended to exhibit from time to time, to an engineer or other person, the speed of a steam-engine, or, in other words, that of any part thereof, as, for instance, the main shaft or fly-wheel; and it consists in a combination composed, first, of a clock time-piece or mechanism to indicate seconds or fractions of a minute, and, second, of an auxiliary hand and mechanism to revolve it synchronously with the speed of the engine or machine, this latter mechanism, when in use, being so applied to the engine or machine as to be put in operation thereby.

If we suppose the ordinary or normal rate of speed of the fly-wheel of the engine is to be sixty revolutions per minute, it will be evident that the hand of the auxiliary mechanism, while such speed is maintained, will travel on the dial of the clock just as fast as the second-hand. Now, should the speed of the engine fall off, the indicating-hand will not travel as fast as the second-hand. So, should the speed of the engine at any time exceed the fixed rate, the indicating-hand will travel on the dial faster than the second-hand. This will suffice to denote to the engineer whether the engine or machine is moving faster or slower than it ought to.

This speed-indicator can be applied to a water-wheel to show whether at any moment it is running faster or slower than its normal rate.

In the drawings, A represents an ordinary clock or time-piece, of which $a$ is the dial, $b$ the hour-hand, $c$ the minute-hand, and $d$ the second-hand, the arbors of such hands being represented as concentric.

There is applied concentrically to the arbor of the second-hand an auxiliary tubular arbor, $e$, carrying another hand, $f$. The said auxiliary arbor is to revolve freely about the second-hand arbor, and it has fixed to it a bevel-gear, $g$, that engages with another bevel-gear, $h$, fixed to a shaft, $i$, extending into and out of the clock. There is fastened to the said shaft a ratchet-wheel, $k$, to engage with a pawl, $l$, pivoted to a disk, $m$, and provided with a spring, $m'$, to press it up to the ratchet-wheel. The disk $m$ is to freely revolve on the shaft $i$, and to be so connected with the engine or machine whose speed is to be indicated as to have reciprocating rotary movements imparted to it thereby while such engine or mechanism is in operation, each of such movements sufficing to move the pawl in the ratchet-wheel the length of a tooth thereof. As a consequence the ratchet-wheel will be intermittingly revolved, and the auxiliary or speed hand will, in a like manner, be moved over the dial, and slower or faster as the rate of movement of the engine or machine may diminish or increase. Thus, by means of the invention, the engineer can readily visibly discover at any time whether the engine is properly performing its duty. Should he find it moving either faster or slower than its proper rate, he will thus be warned to either increase or diminish the supply of the motor as may be necessary to effect the desired result.

I claim as my invention—

The speed-indicator substantially as described, consisting of a clock or time-piece, A, an auxiliary hand, $f$, and mechanism for moving the latter relatively to one of the clock-hands, essentially in manner and for the purpose as explained, by means of an engine, water-wheel, or machine, such mechanism, as represented, consisting of the arbor $e$, gears $g\ h$, shaft $i$, ratchet-wheel $k$, pawl $l$, and disk $m$, all being arranged and applied as set forth.

DANIEL HUSSEY.

Witnesses:
R. H. EDDY,
S. N. PIPER.